(12) United States Patent
Dattke

(10) Patent No.: US 9,280,323 B2
(45) Date of Patent: Mar. 8, 2016

(54) DISPLAY OF SOURCE CODE SEMANTIC LAYERS

(71) Applicant: SAP SE, Walldorf (DE)

(72) Inventor: Rainer Andreas Dattke, Bruchsal (DE)

(73) Assignee: SAP SE, Walldorf (DE)

( * ) Notice: Subject to any disclaimer, the term of this patent is extended or adjusted under 35 U.S.C. 154(b) by 175 days.

(21) Appl. No.: 13/801,122

(22) Filed: Mar. 13, 2013

(65) Prior Publication Data

US 2014/0282385 A1    Sep. 18, 2014

(51) Int. Cl.
*G06F 9/44*    (2006.01)

(52) U.S. Cl.
CPC .. *G06F 8/33* (2013.01); *G06F 8/30* (2013.01); *G06F 8/34* (2013.01)

(58) Field of Classification Search
CPC ................ G06F 8/33; G06F 8/34; G06F 8/30
See application file for complete search history.

(56) References Cited

U.S. PATENT DOCUMENTS

| | | | | |
|---|---|---|---|---|
| 5,764,229 | A * | 6/1998 | Bennett | 715/797 |
| 5,860,009 | A * | 1/1999 | Uchihira | G06F 8/30 714/E11.208 |
| 6,237,135 | B1 * | 5/2001 | Timbol | G06F 8/34 717/107 |
| 6,305,008 | B1 * | 10/2001 | Vaidyanathan | G06F 8/33 707/999.104 |
| 8,181,167 | B2 * | 5/2012 | Zhao | 717/143 |
| 8,365,138 | B2 * | 1/2013 | Iborra | G06F 8/30 717/104 |
| 2002/0062475 | A1 * | 5/2002 | Iborra | G06F 8/30 717/108 |
| 2003/0090473 | A1 * | 5/2003 | Joshi | G06F 8/33 345/173 |
| 2003/0226131 | A1 * | 12/2003 | Li | G06F 8/33 717/110 |
| 2004/0133877 | A1 * | 7/2004 | Mochizuki | G06F 8/33 717/114 |
| 2005/0229154 | A1 * | 10/2005 | Hiew | G06F 8/34 717/110 |
| 2006/0150150 | A1 * | 7/2006 | Tiwari | G06F 8/33 717/110 |
| 2007/0256054 | A1 * | 11/2007 | Byrne et al. | 717/113 |
| 2008/0244424 | A1 * | 10/2008 | Fukuda | G06F 8/34 715/763 |
| 2009/0178031 | A1 * | 7/2009 | Zhao | 717/143 |
| 2009/0319888 | A1 * | 12/2009 | Oygard | 715/252 |
| 2011/0126171 | A1 * | 5/2011 | Neal | G06F 8/34 717/113 |
| 2011/0321003 | A1 * | 12/2011 | Doig | G06F 8/34 717/107 |
| 2012/0210298 | A1 * | 8/2012 | Hodgins | G06F 8/33 717/113 |
| 2012/0324425 | A1 * | 12/2012 | Roberts | G06F 8/33 717/123 |
| 2013/0159892 | A1 * | 6/2013 | Suraj | G06F 8/34 715/762 |

(Continued)

OTHER PUBLICATIONS

Rick Broida, Force Windows to Stay on top of Other Windows, [Online] Feb. 10, 2011, [Retrieved from the Internet] <http://www.pcworld.com/article/218511/Windows.html> 4 pages total.*

(Continued)

*Primary Examiner* — Thuy Dao
*Assistant Examiner* — Ravi K Sinha
(74) *Attorney, Agent, or Firm* — Schwegman Lundberg & Woessner, P.A.

(57) ABSTRACT

Example systems and methods of displaying semantic layers of source code of a computer program are presented. In one example, a user selection of a first portion of the source code is received. The first portion is displayed in a first display area and corresponds to a first semantic layer of the source code. A user command referring to a second portion of the source code related to the first portion is received, with the second portion corresponding to a second semantic layer of the source code. In response to the user command, a second display area for the second portion of the source code is displayed to indicate a relationship between the first and second portions while indicating a difference in semantic layers between the first and second portions.

17 Claims, 11 Drawing Sheets

(56) References Cited

U.S. PATENT DOCUMENTS

| | | | | |
|---|---|---|---|---|
| 2013/0205275 | A1* | 8/2013 | Thomson | G06F 8/34 717/105 |
| 2013/0239089 | A1* | 9/2013 | Eksten | G06F 8/34 717/120 |
| 2014/0047413 | A1* | 2/2014 | Sheive | G06F 8/30 717/110 |

OTHER PUBLICATIONS

Maletic et al., Source code files as structured documents, [Online] 2002, in Program Comprehension, 2002. Proceedings. 10th International Workshop on, [Retrieved from the Internet] <http://ieeexplore.ieee.org/stamp/stamp.jsp?tp=&arnumber=1021351&isnumber=21975> p. 289-292.*

DeLine and Rowan, Code canvas: zooming towards better development environments, [Online] 2010, In Proceedings of the 32nd ACM/IEEE International Conference on Software Engineering—vol. 2 (ICSE '10), vol. 2. ACM, New York, NY, USA, [Retrieved from the Internet] <http://dx.doi.org/10.1145/1810295.1810331> pp. 207-210.*

Collard et al., Supporting document and data views of source code, [Online] 2002, In Proceedings of the 2002 ACM symposium on Document engineering (DocEng '02). ACM, New York, NY, USA, [Retrieved from the Internet] <http://dx.doi.org/10.1145/585058.585066> pp. 34-41.*

Kuhn et al., Semantic clustering: Identifying topics in source code, [Online] Mar. 2007, Information and Software Technology vol. 49, Issue 3, [Retrieved from the Internet] <http://dx.doi.org/10.1016/j.infsof.2006.10.017> pp. 230-243.*

* cited by examiner

```
METHOD delete_from_work_area.                        ╭─ 300
  DATA:
    transport_type TYPE
      if_wb_adt_rest_resource_data=>ty_transport_key.

transport_type = resource_data->get_transport_key( ).
  CALL FUNCTION `RS_DELETE_FROM_WORKING_AREA`
    EXPORTING
      object                = transport_type-objtype
      obj_name              = transport_type-obj_name
      adjust_object_input_data = abap_false.

ENDMETHOD.                              "delete_from_work_area
```

FIG. 3A

```
                                                     ╭─ 300
METHOD delete_from_work_area.
  DATA:
    transport_type TYPE
      if_wb_adt_rest_resource_data=>ty_transport_key.

transport_type = resource_data->get_transport_key( ).
 ┌─────────────────────────────────────────────────────────┐
 │ CALL FUNCTION `RS_DELETE_FROM_WORKING_AREA`      302    │
 │   EXPORTING                                             │
 │     object                = transport_type-objtype      │
 │     obj_name              = transport_type-obj_name     │
 │     adjust_object_input_data = abap_false.              │
 └─────────────────────────────────────────────────────────┘
           304 ─╯
ENDMETHOD.                              "delete_from_work_area
```

FIG. 3B

```
METHOD delete_from_work_area.
   DATA:
      transport_type TYPE
         if_wb_adt_rest_resource_data=>ty_transport_key.

transport_type = resource_data->get_transport_key( ).
   CALL FUNCTION `RS_DELETE_FROM_WORKING_AREA`
      EXPORTING
         object
         obj_name
         adjust_object_input_d
ENDMETHOD.
```

```
METHOD initialize.
   CALL METHOD me->read_settings
     IMPORTING
       setting   = me->settings .
ENDMETHOD.
```

DISPLAY OF SOURCE CODE SEMANTIC LAYERS

FIELD

This application relates generally to computer programming and, in an example embodiment, to the representation of semantic layers of source code of a computer program.

BACKGROUND

Many programming languages, such as ABAP® (Advanced Business Application Programming) by SAP AG, Java® by Oracle Corporation, and others, including both object-oriented and non-object-oriented languages, possess the quality of semantic "layers" or levels. For example, in the object-oriented quality of inheritance, a derived class may inherit and redefine certain behaviors and attributes from a superclass. In such cases, the derived class and its related superclass may be considered as occupying separate semantic layers in the same computer program. In ABAP, enhancement sections are code sections or modules that replace code sections or modules of original source code. Thus, an enhancement section may be viewed as representing a different semantic layer from the code that it replaces. Many other examples of varying semantic layers in a computer program, such as code stubs, proxies, and façades, exist. Further, such semantic layers may be represented in commands, data structures, code modules, data patterns, and other constructs employed in source code. Generally, a programmer's knowledge and understanding of the various semantic layers exhibited by the source code of a particular computer program aid in the programmer's overall understanding of the program during program development, testing, and debugging.

BRIEF DESCRIPTION OF DRAWINGS

The present disclosure is illustrated by way of example and not limitation in the figures of the accompanying drawings, in which like references indicate similar elements and in which:

FIGS. 3A through 3E are a series of example displays of source code exemplifying an example method of displaying semantic layers;

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
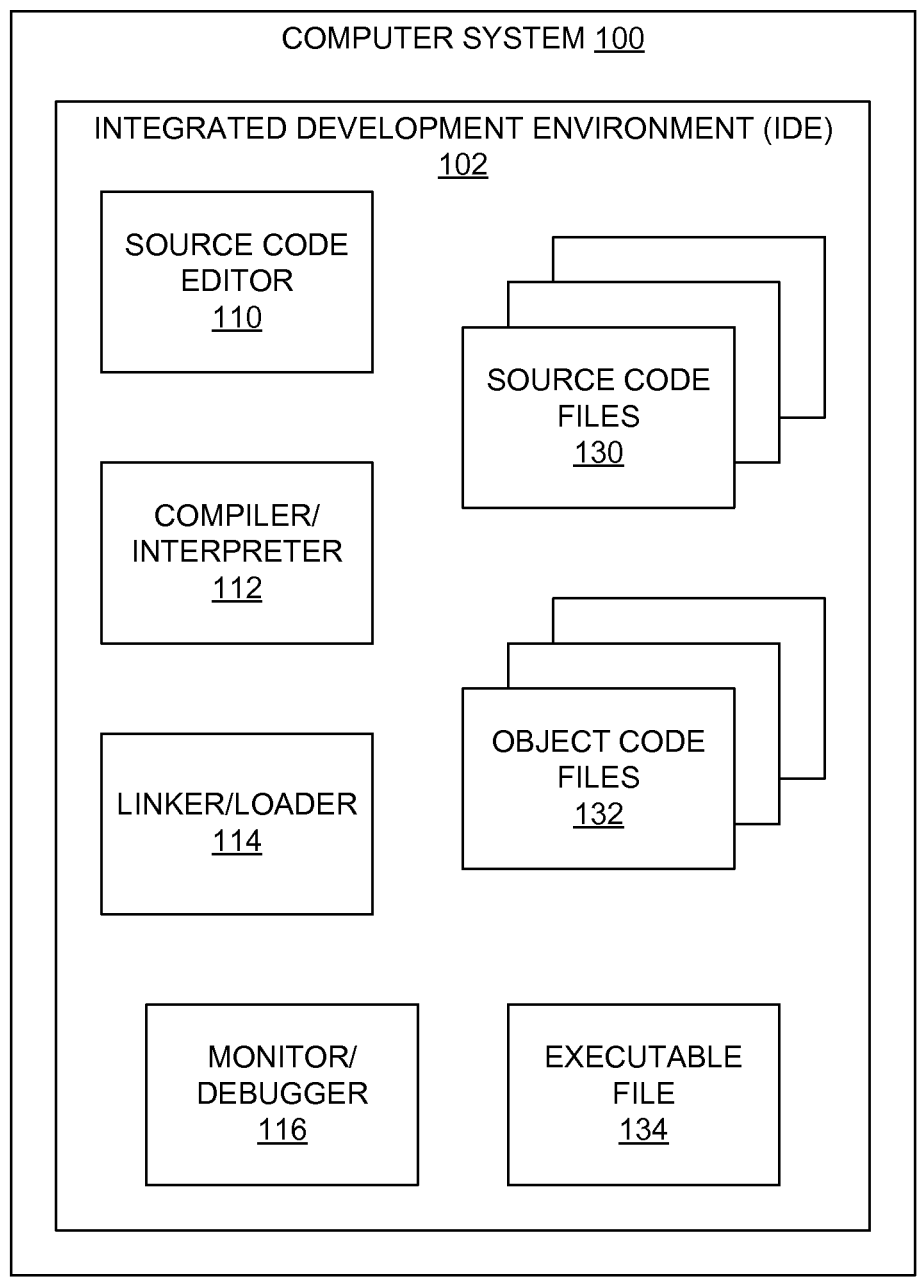
FIG. 1 is a block diagram of an example computer system providing an integrated development environment by which semantic layers of source code may be displayed.

FIG. 1 is a block diagram of an example computer system 100 providing an integrated development environment (IDE) 102 in which methods of displaying two or more semantic layers of source code may be performed. The IDE 102 may allow a programmer or other user to develop, execute, test, and debug source code for use as a computer program or application. In the example of FIG. 1, the IDE 102 may include a source code editor 110, a compiler/interpreter 112, a linker/loader 114, and a monitor/debugger 116. In some implementations, other modules or applications may be included in the IDE 102, while some modules shown in FIG. 1 may be omitted in other embodiments. In one implementation, a user may access the IDE 102 directly via a user interface of the computer system 100. As a result, the computer system 100 may be, for example, a desktop computer, a laptop computer, a tablet computer, or the like. In another example, the computer system 100 may be a server system which the user may access over a communication network, such as a wide area network (WAN) or a local area network (LAN), via a client device, such as a desktop, laptop, or tablet computer, or a mobile communication device, such as a smartphone, personal digital assistant (PDA), or the like.

The source code editor 110 of FIG. 1 may allow a user to write and edit source code, resulting in one or more source code files 130 being generated for a program or application. The source code editor 110 may aid the user in programming in one or more programming languages, such as ABAP®, Java®, C++, or other compiled or interpreted languages. The source code editor 110 may also provide additional programming support, such as recognitions of language-specific keywords or operators, syntax-checking, and so on.

A compiler/interpreter 112 may compile or interpret the source code files 130, possibly in addition to other preexisting source code files 130, to generate one or more object code files 132 that are in a format that is understandable by the computer system 100 or another physical or virtual computer system or machine. A linker/loader 114 may receive the object code files 132 as input to generate an executable file 134 for the program or application, which is in a form to be executed directly by the computer system 100 or another system or machine. A user may then employ the monitor/debugger 116 to test the resulting executable file 134, debug any problems encountered, and make changes to one or more of the source code files 130 via the source code editor 110. The edited source code files 130 may then be compiled, linked, loaded, executed, and the like as described above to retest the resulting executable file 134. Further, the user may employ this process using the IDE 102 in an iterative manner until the executable file 134 operates as desired.

In some examples, at least one of the source code editor 110 and the monitor/debugger 116 of the IDE 102 may employ one or more aspects of the display of semantic layers of the source code files 130, as described in greater detail below. In other implementations, any other type of application that displays source code to a user, such as a source code editor not provided as part of an IDE, may implement one or more aspects of semantic layer display described hereinafter.

Figure 2:
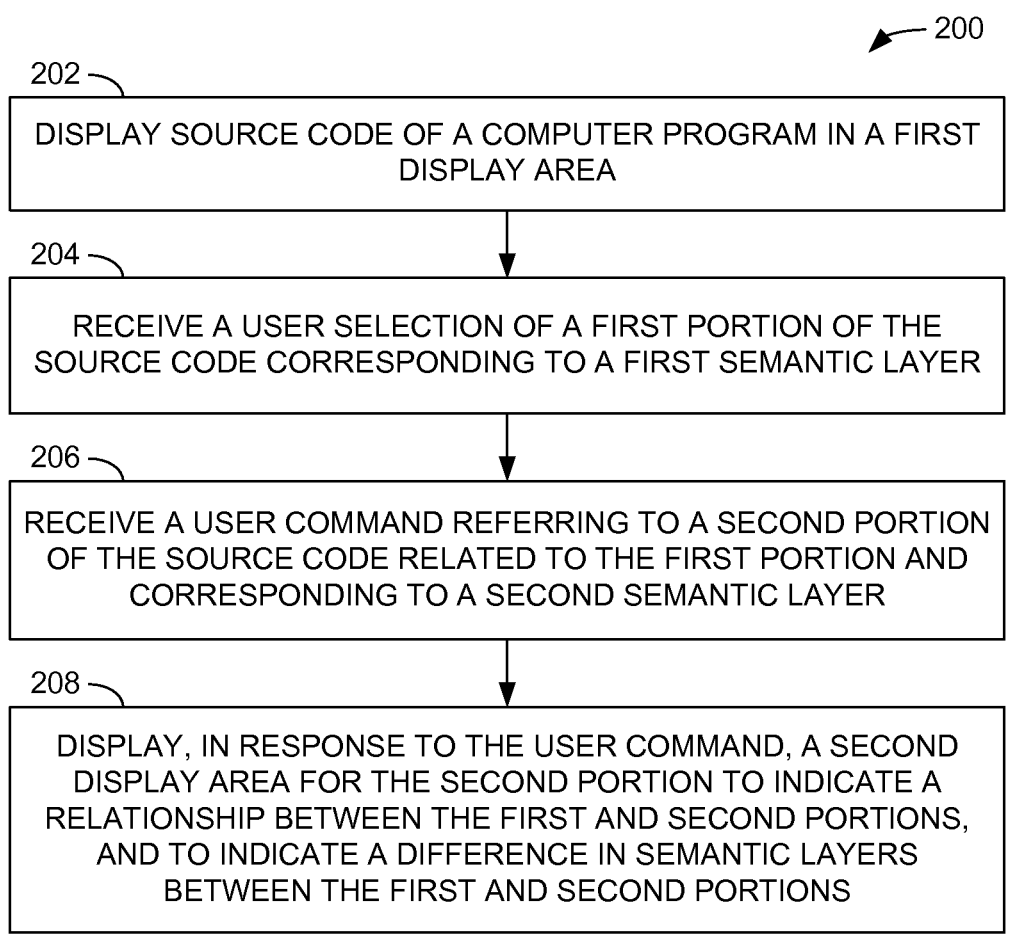
FIG. 2 is a flow diagram illustrating an example method of displaying semantic layers of source code.

FIG. 2 is a flow diagram illustrating an example method 200 of displaying semantic layers of source code. While at least some of the operations of the method 200 and other methods described herein may be performed in the computer system 100 of FIG. 1, other devices or systems may be employed to perform the method 200 in other embodiments.

In the method 200, source code of a computer program, such as source code from one of the source code files 130 of FIG. 1, may be displayed in a first display area (operation 202), such as by way of a computer monitor or other display device. A user selection of a first portion of the source code corresponding to a first semantic layer is received (operation 204). A user command referring to a second portion of the source code related to the first portion and corresponding to a second semantic layer is also received (operation 206). In response to the user command, a second display area for the second portion may be displayed (operation 208). The second display area may indicate a relationship between the first and second portions of the source code, and may also indicate a difference in the semantic layers between the first and second portions.

In one example, the second display area may include the second portion of the source code at the time the second display is presented to a user. In such an example, an editor, debugger, or other application or module providing the display may generate and/or access previously generated data that indicates how different portions of the source code are related to each other in a semantic context, such as which portions of code serve as code stubs for other portions. In the system of FIG. 2, such information may be generated by the source code editor 110, the compiler/interpreter 112, the linker/loader 114, the monitor/debugger 116, or another module or system. In another implementation, the second display area may present to a programmer an area into which new code for the second portion may be entered.

As discussed further below, portions of source code may be identified or associated with separate semantic levels or "layers." More specifically, one portion of source code may be logically related to another portion of source code according to some hierarchy or order, in which the source code of one semantic layer may be logically viewed as being related to source code of a higher or lower semantic layer. As mentioned above, derived classes of object-oriented source code may be viewed as residing within a higher semantic layer relative to its base class or superclass. Similarly, ABAP® enhancement code sections that replace other code sections may be viewed as belonging to a higher semantic layer of the source code than the code sections they replace. These and other code constructs that involve more than one semantic layer are described below. Further, other code constructs not specifically described or mentioned herein, which may involve commands, data structures, code modules, data patterns, code patterns, and the like, may also represent one or more semantic layers capable of being displayed using aspects of the various embodiments presented herein.

While the operations 202 through 208 of the method 200 of FIG. 2 are shown in a specific order, other orders of operation, including possibly concurrent or continual execution of at least portions of one or more operations, may be possible in some implementations of method 200, as well as other methods discussed herein. For example, the display of the source code in a first display area (operation 202) may overlap any or all of the receiving of the user selection (operation 204), the receiving of the user command (operation 206), and the displaying of the second display area (operation 208) in some embodiments.

Figure 3C:
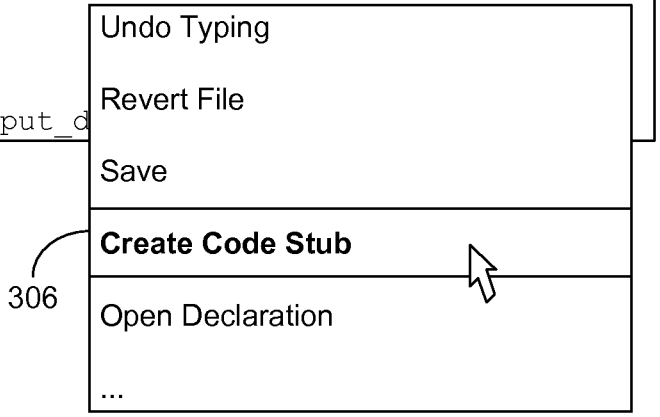

FIGS. 3A through 3E are a series of example displays of source code exemplifying an example method of displaying semantic layers within the source code. In one example, the displays are provided via a user interface for an editor, monitor/debugger, or other application or module capable of displaying source code, such as what may be provided in an IDE. In FIG. 3A, a section of source code 300 is displayed to a user, such as via a computer monitor, touchscreen, or other display device or component. In this particular example, the source code is written in the ABAP® language, although source code written in any other programming language may benefit from application of the various aspects of the embodiments described herein.

In FIG. 3B, a user selection of a first portion 302 of the source code 300 is received. In one example, a user may highlight the first portion 302 using a pointer device, such as a mouse, touchpad, touchscreen, or similar device to select a block of text as the first portion 302 of the source code 300. In another example, the user may employ one or more keys of a keyboard, such as directional keys, a "shift" key, an "enter" key, and the like, to select the first portion 302 of the source code 300. As shown, the first portion 302 is a contiguous block of the source code, although other implementations may not be limited in such a manner. Also, while the entire first portion 302 may be seen in the display of FIG. 3B, only a part of the first portion 302 may be visible to the user at any one time if a large number of lines of the source code 300 have been selected as the first portion 302. In one example, the area of the display in which first portion 302 is located may be considered a first display area 304.

FIG. 3C depicts the selection of a user command 306 referring to a second portion of the source code 300. In this specific example, the user has accessed a drop-down menu 305, such as by way of a right-button mouse click on the selected first portion 302 of the source code 300, to access the command (e.g., "Create Code Stub"), such as by way of a left-button mouse click to create a code stub (e.g., a second portion of the source code) for the first portion 302. Other methods of accessing such commands, including drop-down menus from a menu bar associated with a source code editor, manual text entry of the command, and so on, may be utilized in other examples. In this particular example, the command 306 facilitates the creation of a code stub to be entered by the user to operate in place of the first portion 302 of the source code 300. For example, if the first portion 302 has not been tested sufficiently to provide some level of confidence in its operation, the code stub may perform a much simpler operation to return data ordinarily expected from the first portion 302 so that other portions of the source code 300 may be tested effectively.

Figure 3D:
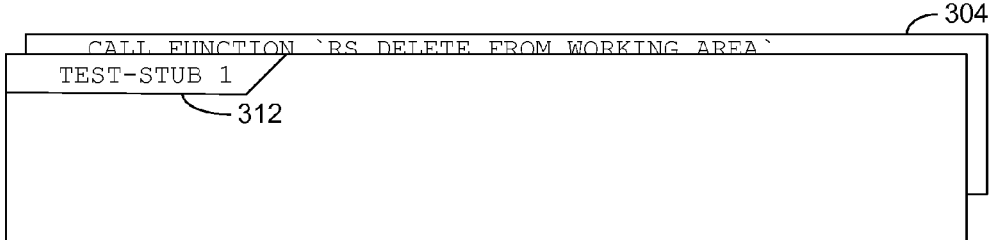

As shown in FIG. 3D, a second display area 310 associated with the first display area 304 is presented in response to the command 306. In this implementation, the second display area 310 is located atop the first display area 304, thus covering at least some of the first portion 302 of the source code 300, thus providing a three-dimensional representation of the second display area 310 and the first display area 304. In one example, the second display area 310 includes a title bar 312, which may include a default title (e.g., "TEST-STUB 1") that the user may update with a customized title. At the time of the presentation of the second display area 310, the second display area 310 provides a blank text entry area within which the user may type source code to be employed as a code stub for the first portion 302 of the source code 300.

Figure 3E:
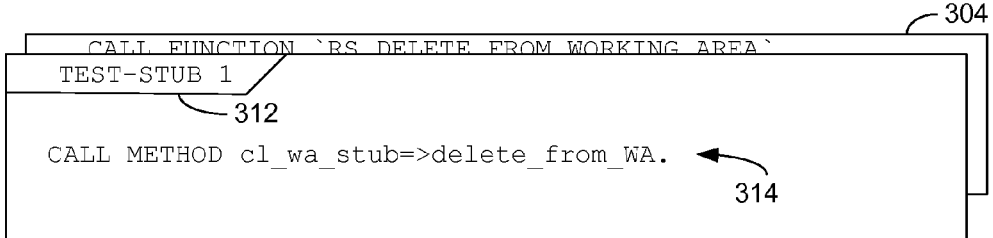

FIG. 3E depicts a display in which the user has begun typing a second portion 314 of the source code 300 within the second display area 310 to serve as a code stub for the first portion 302 of the first display area 304. Thus, the second portion 314 represents a second, higher semantic level of the source code 300 relative to the first, lower semantic level of the first portion 302, as the first portion 302 is, in effect, hidden or blocked from operating via the second portion 314 of the source code 300. In this example, the relationship of the first portion 302 to the second portion 314 is indicated by way of the overlap of the first display area 304 by the second display area 310 in a three-dimensional fashion. However, other ways of denoting the relationship graphically or visually exist, either by way of two-dimensional or three-dimensional visual effects.

In addition to code stubs, aspects of the implementation of FIGS. 3A through 3E may also be applied to similar semantic layer structures, such as mock objects and code injections. A mock object, for example, is an object that can simulate the behavior of one or more other, more complex objects to facilitate the testing of yet one or more other objects of the source code. As a result, a mock object may represent a higher semantic layer of source code compared to the semantic layer of the complex object being simulated.

In another example, a beneficial code injection is the injection or insertion of source code into a separate location within the source code to facilitate additional or different functionality than what would be available in the absence of the injected code. Such a code injection is distinguished from a malicious code injection, in which code is injected into a system from an external source to cause a malicious effect, such as modifying a database to compromise the data within, to extract confidential information in an unauthorized manner, or to initiate some other malevolent action. With a beneficial code injection, the portion code being injected may be considered to reside at a higher semantic level than the portion of code surrounding the injection site. Accordingly, implementations described above and below may be applied to both code injections and mock objects to enhance the understanding of a user or programmer of the overall structure of the source code.

In the example of FIG. 3E, each of the first display area 304 and the second display area 310 is surrounded by a border or similar graphical boundary. However, either or both of the first display area 304 and the second display area 310 may be designated via other means, such as, for example, by rendering the first portion 302 and/or the second portion 314 of the source code 300 in bold, underlined, or italicized characters; by using text of one or more colors; by providing backgrounds of different colors; or via other means.

Figures 4A, 4B:
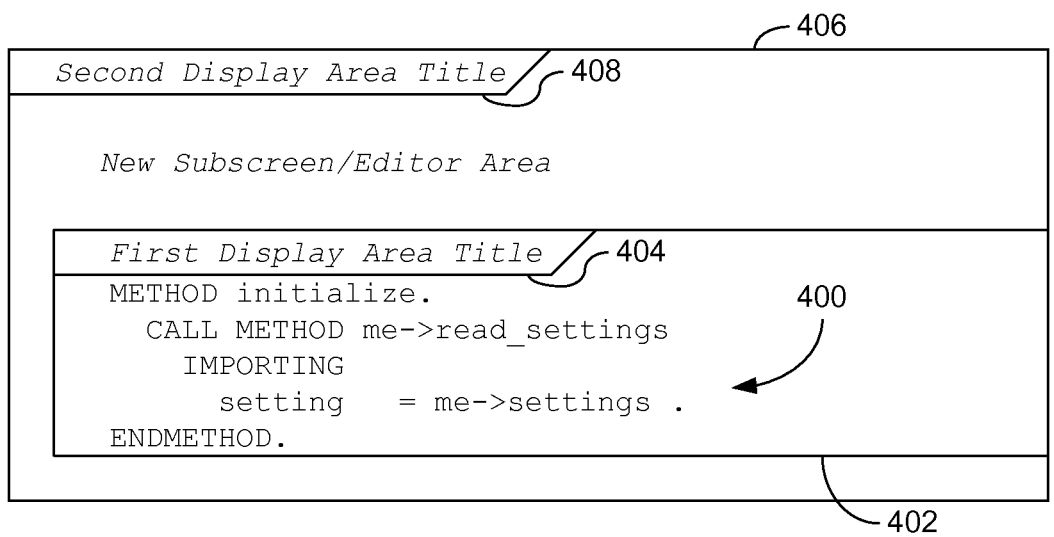
FIG. 4A is an example display of a first portion of source code representing a first semantic layer.
FIG. 4B is an example display of the first portion of the source code of FIG. 4A including a display area for a second portion of the source code representing a second semantic layer related to the first portion according to a two-dimensional arrangement.

As shown in FIGS. 3D and 3E, and as mentioned above, a three-dimensional graphic distinguishes the first semantic layer of the first portion 302 from the second, higher semantic layer of the second portion 314 of the source code 300. FIGS. 4A and 4B describe another example in which semantic layers are distinguished via a two-dimensional graphical scheme. More specifically, FIG. 4A is an example display of a first portion 400 of source code that represents a first semantic layer. In one example, the first portion 400 may be selected from a larger part of the source code, as described above in conjunction with FIG. 3B.

FIG. 4B is an example display of the first portion 400 of the source code of FIG. 4A that includes a second display area 406 for a second portion of the source code representing a second semantic layer related to the first portion 400 according to a two-dimensional arrangement. More specifically, a user command may be received that refers to the second portion of the source code at the second semantic layer that is to be generated, with the second portion being related to the first portion 400 representing a first semantic layer of the source code. In response to the command, the second display area 406 is generated, which surrounds a first display area 402 that includes the first portion 400 of the source code in a two-dimensional graphical arrangement that allows the user to view the code of both the first display area 402 and the second display area 406 simultaneously. The second display area 406 provides an area in which the user may enter the second portion of the source code, such as, for example, replacement code for the first portion 400. Accordingly, the replacement code represents a second, higher semantic layer that is to replace the original code of the first portion 400. In this specific example, the second display area 406 surrounding the first display area 402 signifies that the second portion of the source code is related to the first portion, and also resides at a higher semantic layer than the first portion 400. As also shown in FIG. 4B, the first display area 402 includes a first display title area 404 while the second display area 406 includes a second display title area 408, into each of which the user may enter a customized title for each of the first portion 400 and the second portion, respectively.

Figure 5A:
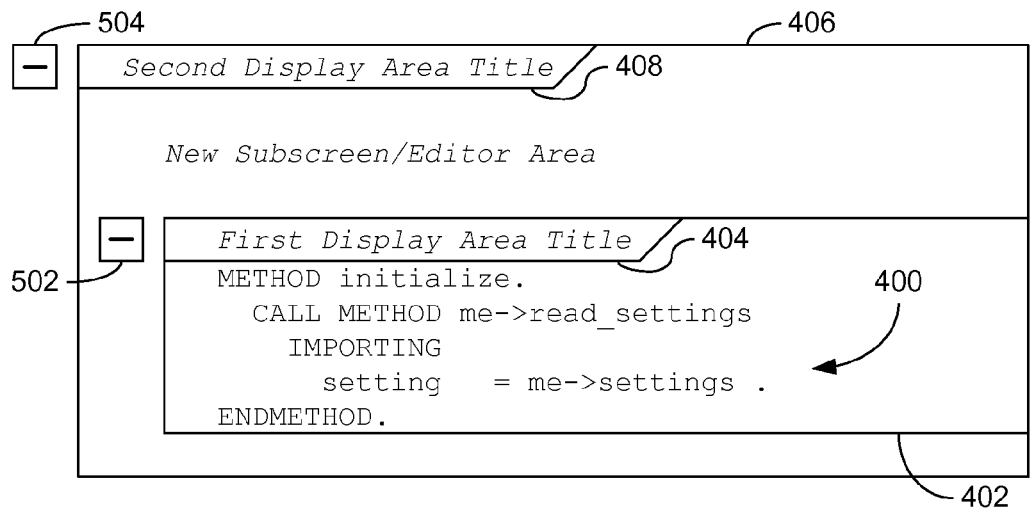
FIGS. 5A through 5C are a series of example displays of the first and second portions of the source code of FIG. 4B with associated collapse/expand controls according to a two-dimensional arrangement.
Figure 5B:
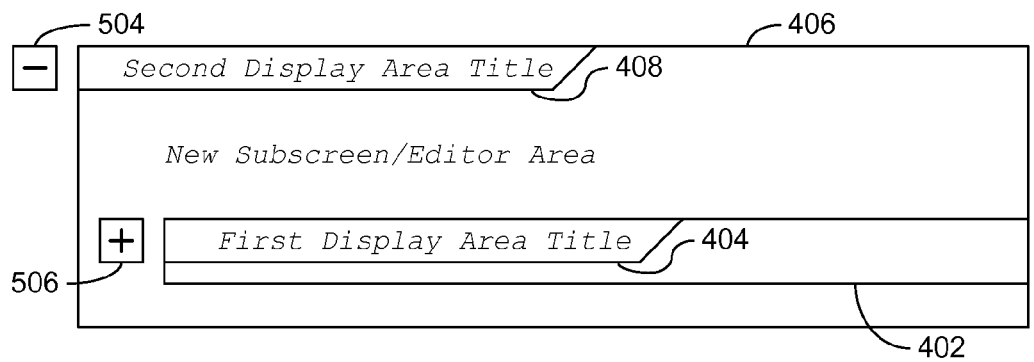
Figure 5C:
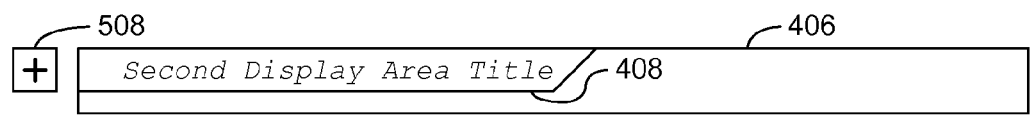

FIGS. 5A through 5C are a series of example displays of the first portion 400 and second portion referred to in FIG. 4B that include associated collapse/expand controls. As shown in FIG. 4B, the first display area 402 and the second display area 406 are shown relative to each other in a two-dimensional arrangement in FIG. 5A. Additionally, the first display area 402 includes a first collapse control 502, and the second display area 406 includes a second collapse control 504, thus allowing the user to collapse either or both of the display areas 402, 406 independently, thus hiding the code associated with the collapsed display area 402, 406. In response to the user activating the first collapse control 502, the first display area 402 is collapsed, or reduced in size, resulting in the display depicted in FIG. 5B. In addition, the first collapse control 502 is converted to a first expand control 506 to allow the user to expand the first display area 402 to its original configuration. If the user then activates the second collapse control 504, the display of FIG. 5C may result, in which both the second display area 406 is collapsed, and the second collapse control 504 is replaced with a second expand control 508 to allow the user to expand the second display area 406 to its original configuration.

As shown in the display of FIG. 5C, the second display area 406, when collapsed, completely hides the first display area 402. In one example, the first display area 402 may be hidden under such circumstances regardless of whether the first display area 402 is in a collapsed or expanded state.

Figure 6A:
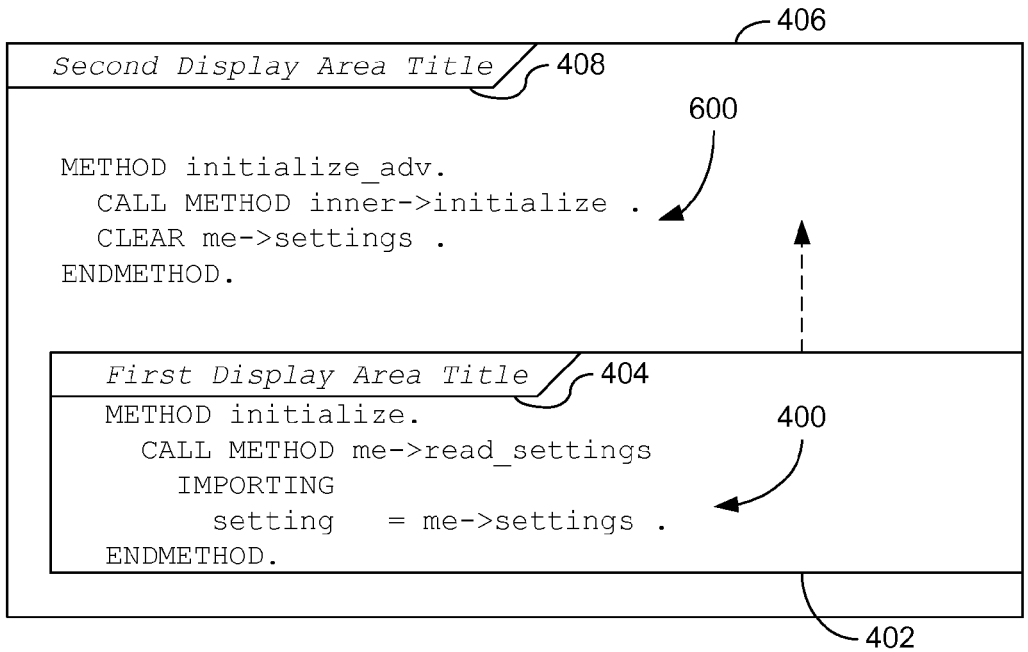
FIGS. 6A and 6B are example displays of source code in which a first portion of the source code associated with a first semantic layer may be relocated within a second portion of the source code associated with a second semantic layer according to a two-dimensional arrangement.
Figure 6B:
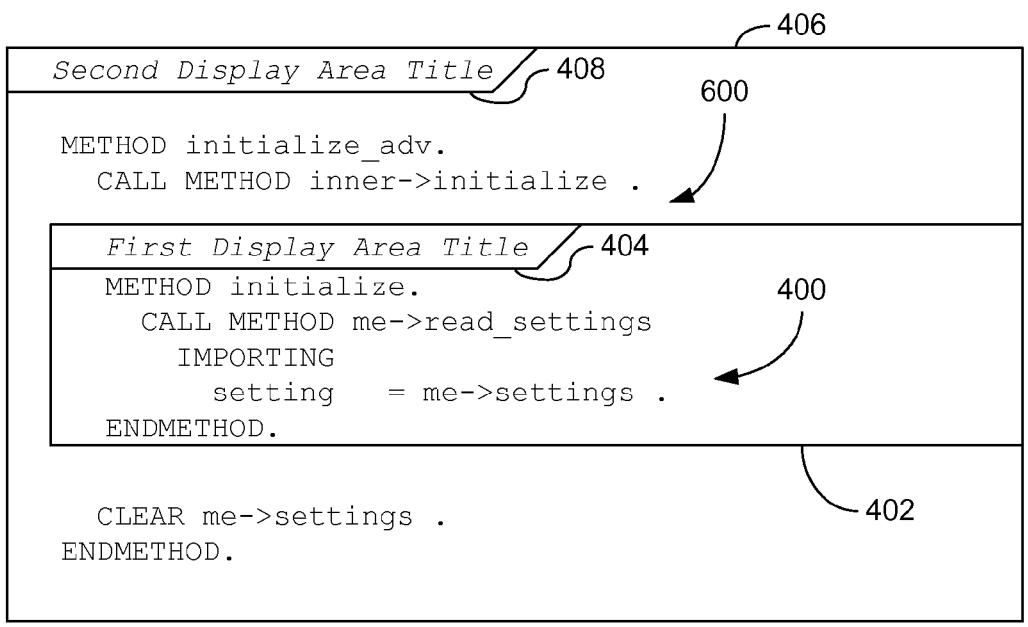
Figure 7:
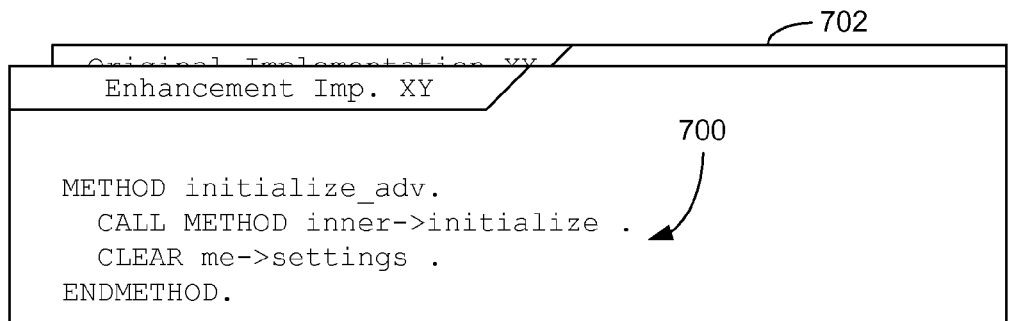
FIG. 7 is an example display of source code representing separate semantic layers in a three-dimensional arrangement.

FIGS. 6A and 6B expand upon the example of FIG. 4B by allowing the first display area 402 to be moved or relocated within the second display area 406. As shown in FIG. 6A, the user has entered a second portion 600 of the source code, with the second portion 600 serving as a second, higher semantic layer relative to the first semantic layer of the first portion 400. The user may then decide to relocate the first display area 402 within the second display area 406. In one example, the user may use a cursor to "grab" the first display area 402 and move it toward the upper end of the second display area 406, as is shown in FIG. 6B. In response, individual lines of the second portion 600 of the source code may be relocated from above the first display area 402 to below the first display area 402 to accommodate the new location of the first display area 402. In one example, the user may employ such functionality so that the location of the first display area 402 is positioned in a more logical location within the second portion 600 of the source code illustrated in the second display area 406.

In contrast to the two-dimensional examples of FIGS. 4B, 5A, 5B, 5C, 6A, and 6B, FIG. 7 is an example display of source code representing separate semantic layers in a three-dimensional arrangement. In this example, an enhancement section ("Enhancement Imp. XY") 700 in a second display area 706 representing the higher semantic layer at least partially covers or obscures a first display area 702 of the lower semantic layer. In this example, the second display area 706 is opaque in appearance, resulting in none of the first portion of the source code in the first display area 702 remaining visible to the user. In other examples, the second display area 706 may appear translucent or transparent, thus allowing at least some portion of the first display area 702 to remain visible to the user.

Figure 8:
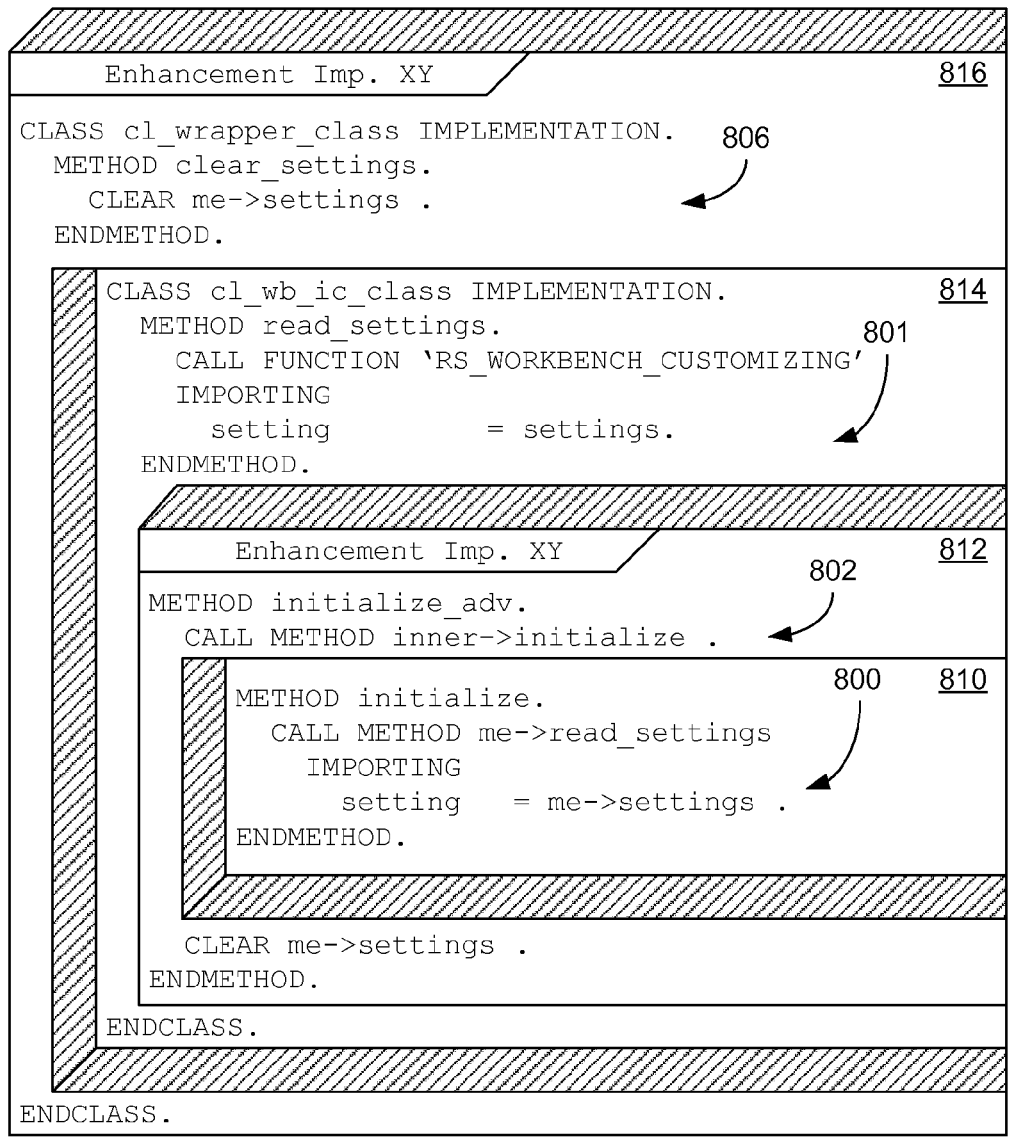
FIG. 8 is an example display of source code representing nested sections of source code representing separate semantic layers in a three-dimensional arrangement.

In another three-dimensional arrangement, FIG. 8 is an example display of source code depicting nested sections of source code representing separate semantic layers. In this example, a first display area 810 of a first portion 800 of source code is surrounded by a second display area 812 of a second portion 802 serving as enhancement code for the first portion 800. Further, the first display area 810 appears at a lower graphical level from the point of view of the user compared to the raised second display area 812, thus indicating graphically that the first portion 800 of source code resides at a lower semantic layer than that of the second portion 802.

Additionally, the first portion 800 constitutes part of a larger third portion 801 of the source code. Accordingly, the first display area 810, as well as the second display area 812, is surrounded by a third display area 814 for the third portion 801. As with the first display area 810, the third display area 814 is shown at the lower graphical level to indicate that the first portion 800 and the third portion 801 reside at the same semantic level. Further, the third display area 814, and thus the first display area 810 and the second display area 812, are surrounded by a fourth display area 816 that includes a fourth portion 806 of source code serving as enhancement code for the third portion 801. Also, the fourth portion 806 is portrayed as residing in the second semantic layer with the second portion 802. In one example, the second display area 812 and the fourth display area 816 are identically labeled ("Enhancement Imp. XY"), possibly indicating that their associated code portions 802, 806 are to be implemented together in code versions in which the enhancement section is to be incorporated in the source code.

Figure 9:
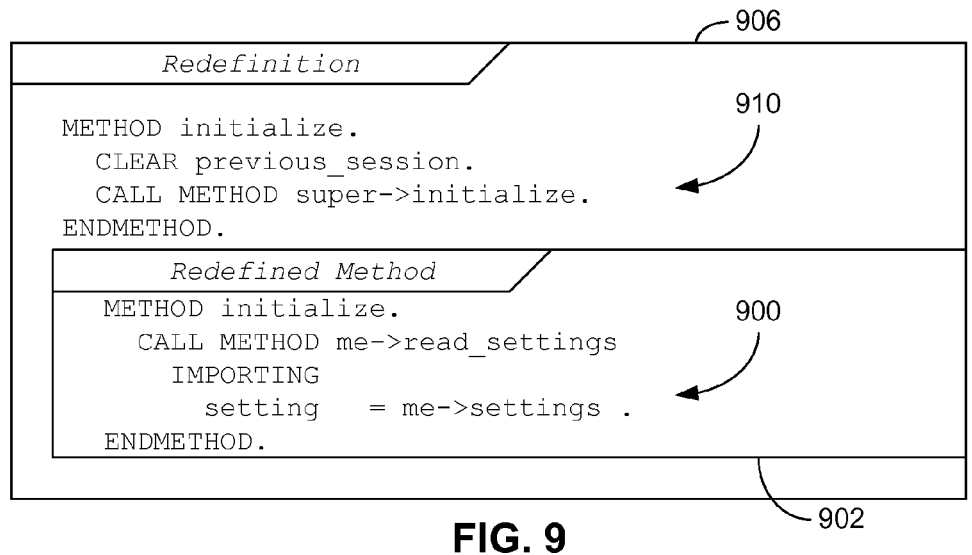
FIG. 9 is an example display of source code representing separate semantic layers involving a redefined method and its redefinition in a two-dimensional arrangement.
Figure 10:
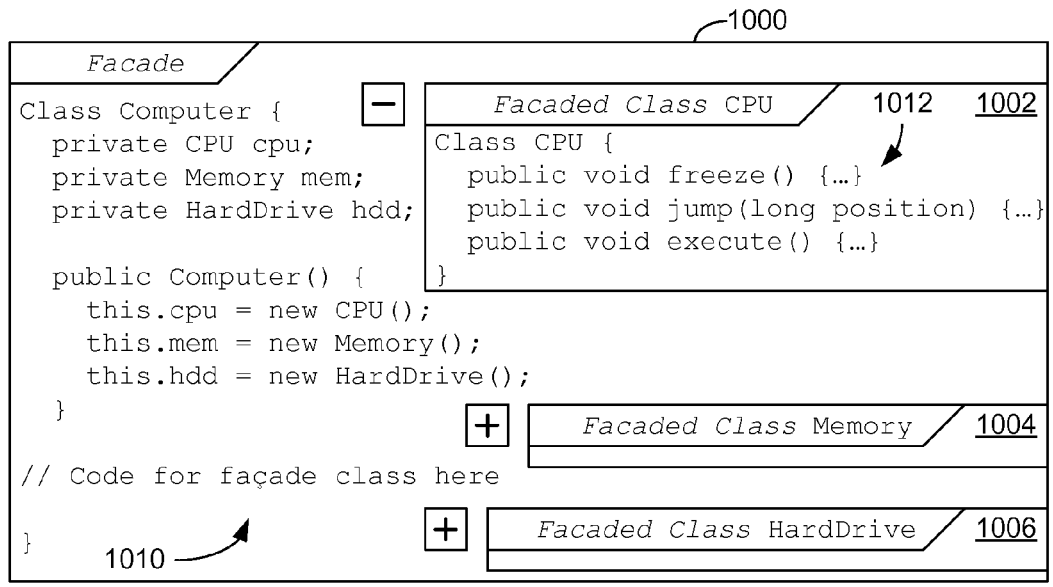
FIG. 10 is an example display of source code representing separate semantic layers involving a façade class and its related subclasses in a two-dimensional arrangement.
Figure 11:
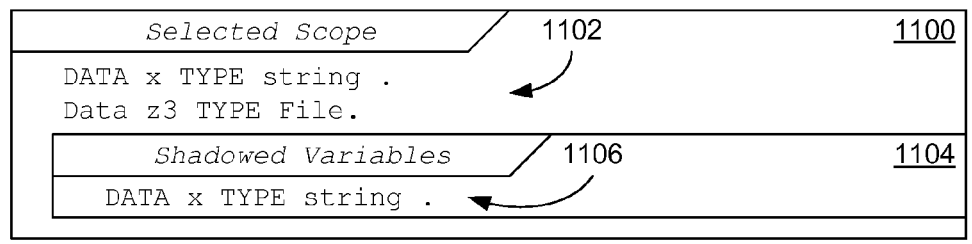
FIG. 11 is an example display of source code representing separate semantic layers indicating shadowed variables in a two-dimensional arrangement.

FIGS. 9, 10, and 11 are example two-dimensional displays that distinguish code of different semantic layers under three separate scenarios. For instance, FIG. 9 is an example display of source code representing separate semantic layers involving a redefined object-oriented method and its redefinition. In this example, a first display area 902 includes a first portion 900 of source code for a method that is being redefined. In other words, the first portion 900 represents a method of a base class or superclass. A second display area 906 that surrounds the first display area 902 includes a second portion 910 of code that specifies a method of a subclass that redefines or overrides the method of the redefined class. In one example, the display of FIG. 9 may be generated by way of a user selecting the redefined method in the first portion 900 in the source code and requesting a redefinition of the method, if available. In another example, the second display area 906 may be opened to allow the user to enter the second portion 910 of the source code in response to a selection of the first portion 900 and a command to create a redefinition of the selected first portion 900. In yet another implementation, the display of FIG. 9 may be provided in response to the user selecting the redefinition in the source code and requesting display of a corresponding method being redefined.

FIG. 10 is an example display of source code representing separate semantic layers involving a façade class and its related subclasses. Generally, a façade class in object-oriented programming provides a simplified interface to one or more other classes, or to a class library. In the example of FIG. 10, a CPU class is displayed as a first portion 1012 of source code in a first display area 1002, a Memory class is displayed as a second portion of source code in a second display area 1004, and a HardDrive class is displayed as a third portion of source code in a third display area 1006. As shown, each of the first display area 1002, the second display area 1004, and the third display area 1006 is collapsible or expandable, as described above in conjunction with FIGS. 5A, 5B, and 5C. In the display of FIG. 10, the first display area 1002 is in an expanded state, while the second display area 1004 and the third display area 1006 are in a collapsed state.

Also shown in FIG. 10 is a fourth display area 1000 with a fourth portion 1010 of the source code that is a class called Computer, which serves as a façade class for the CPU, Memory, and HardDrive classes shown. As a result, the façade class of the fourth display area 1000 represents a higher semantic layer than the semantic layer associated with the CPU, Memory, and HardDrive subclasses. In one example, the user may select each of the CPU, Memory, and HardDrive subclasses in the source code, and select a command to generate a façade for those classes. In response, the fourth display area 1000 may be presented as surrounding the three selected subclasses, with the fourth display area 1000 providing a region in which the user may write the source code for the related façade class. In other examples in which the façade code has already been written, the user may select one of the three subclasses and select a command to display any façade classes related thereto. Oppositely, the user may select a façade class and issue a command requesting display of each subclass for which the selected class operates as a façade.

More generally, the implementation of FIG. 10 may be applied to many different types of façades and proxies often employed in source code. Generally, a façade, including the façade class described above, simplifies the interface to an underlying software object, class, data structure, or other construct. Similarly, a proxy, as employed within object-oriented source code, is a class that functions as an interface to a software resource that is difficult to duplicate, such as a large memory object, a file, or a network connection. Thus, as both façades and proxies may represent higher semantic layers relative to the constructs for which they serve as interfaces, these software patterns, as well as the underlying source code for which they provide an interface, may be displayed according to the various implementations described herein.

FIG. 11 is an example display of source code representing separate semantic layers related to shadowed variables. Generally, a shadowed variable is a variable within a particular limited scope of the source code, such as an inner class, method, or code block, that possesses the same name as another variable declared outside the limited scope associated with the shadowed variable. Consequently, the shadowed variables may be viewed as representing a lower semantic level compared to that of the identically-named variables of the outer scope.

In the example of FIG. 11, a first portion 1106 of source code in a first display area 1104 is a declaration of a variable (labeled "x") that is being shadowed, while a second display area 1100 includes a second portion 1102 of the source code that includes the variable of the outer scope that shadows the shadowed variable. In one implementation, a user may select a particular scope of the source code, such as a particular class or method, as the second portion 1102 in the second display area 1100, and then initiate a command to display any variables that are shadowed within that scope as the first portion 1106 via a first display area 1104. In another example, the user may select one or more variables that may be shadowed as the first portion 1106 of the first display area 1104 and initiate a command to show variables that shadow any variables of the first portion 1106 as the second portion 1102 of the source code in the second display area 1100.

While each of the examples discussed above involve two semantic layers, other implementations of the embodiments discussed herein may involve three or more semantic layers without limitation. Further, while several different types of semantic layers have been discussed herein, the embodiments described above may also be applied to other types of source code semantic layers not specifically addressed herein. Also, each example that employs a two-dimensional graphical arrangement may employ a three-dimensional representation in alternate embodiments, and vice-versa. Further, aspects of any example described herein may be combined with one or more aspects of other examples to generate additional embodiments.

According to at least some embodiments described herein, a code editor, monitor, debugger, or other application presenting source code to a user may include the display of related multiple sections of source code corresponding to different semantic layers to increase the comprehension or understanding of a programmer, tester, or other user regarding the code. The display may relate which portions of code are related to each other, as well as their semantic relationship to each other. In some examples, the application may also facilitate the generation by the user of a particular type of code for a portion of preexisting code, such as the addition of a code stub, a façade class, and the like, as explained above.

Figure 12:
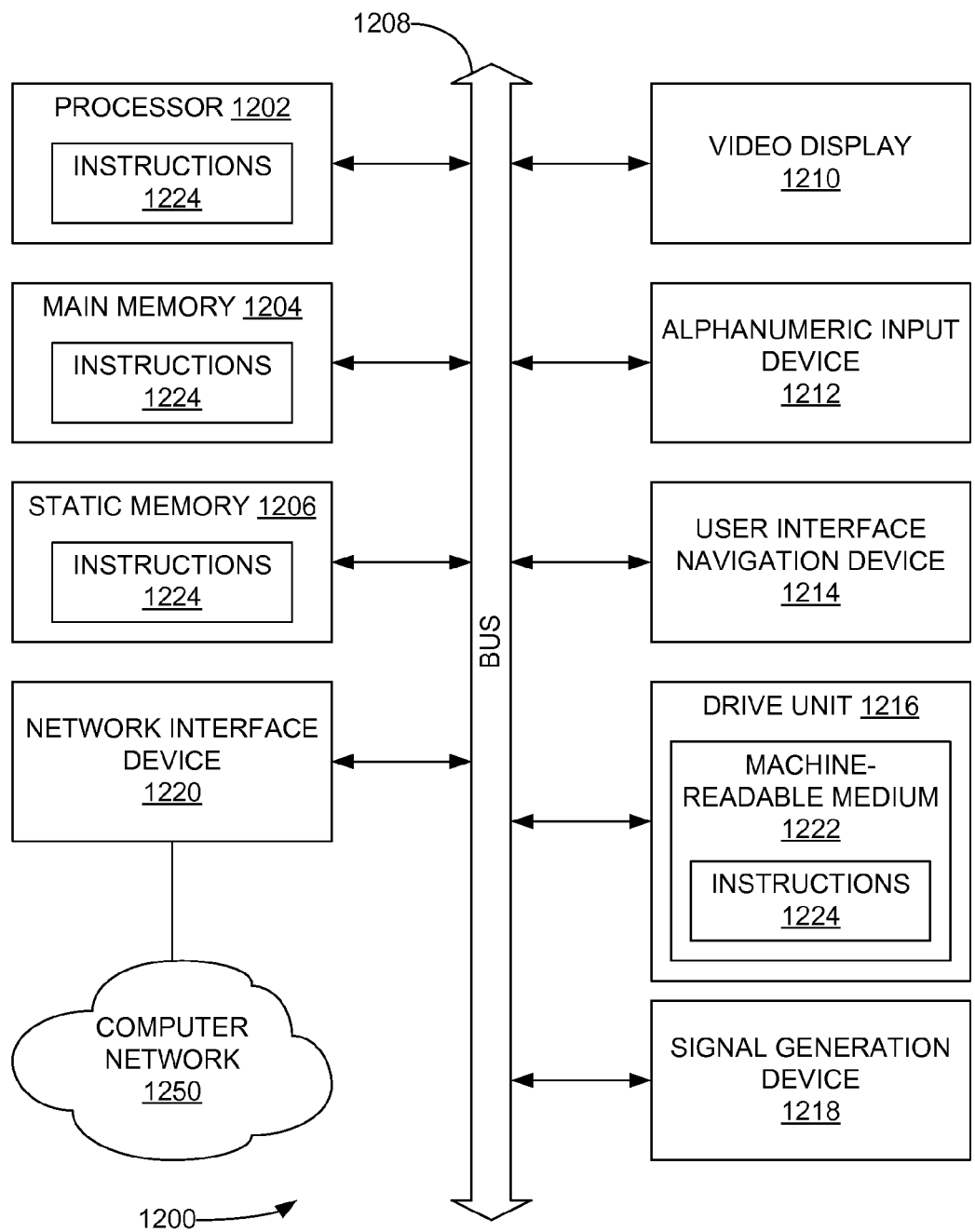
FIG. 12 is a block diagram of a machine in the example form of a processing system within which may be executed a set of instructions for causing the machine to perform any one or more of the methodologies discussed herein.

FIG. 12 depicts a block diagram of a machine in the example form of a processing system 1200 within which may be executed a set of instructions 1224 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1200 includes a processor 1202 (e.g., a central processing unit (CPU), a graphics processing unit (GPU), or both), a main memory 1204 (e.g., random access memory), and static memory 1206 (e.g., static random-access memory), which communicate with each other via bus 1208. The processing system 1200 may further include video display unit 1210 (e.g., a plasma display, a liquid crystal display (LCD), or a cathode ray tube (CRT)). The processing system 1200 also includes an alpha-numeric input device 1212 (e.g., a keyboard), a user interface (UI) navigation device 1214 (e.g., a mouse), a disk drive unit 1216, a signal generation device 1218 (e.g., a speaker), and a network interface device 1220.

The disk drive unit 1216 (a type of non-volatile memory storage) includes a machine-readable medium 1222 on which is stored one or more sets of data structures and instructions 1224 (e.g., software) embodying or utilized by any one or more of the methodologies or functions described herein. The data structures and instructions 1224 may also reside, completely or at least partially, within the main memory 1204, the static memory 1206, and/or within the processor 1202 during execution thereof by processing system 1200, with the main memory 1204 and processor 1202 also constituting machine-readable, tangible media.

The data structures and instructions 1224 may further be transmitted or received over a computer network 1250 via network interface device 1220 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1200) or one or more hardware modules of a computer system (e.g., a processor 1202 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1202 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1202 that is configured using software, the general-purpose processor 1202 may be configured as respective different hardware modules at different times. Software may accordingly configure a processor 1202, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1202 that are temporarily configured (e.g., by software) or permanently configured to perform the relevant operations. Whether temporarily or permanently configured, such processors 1202 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1202 or processor-implemented modules. The performance of certain of the operations may be distributed among the one or more processors 1202, not only residing within a single machine but deployed across a number of machines. In some example embodiments, the processors 1202 may be located in a single location (e.g., within a home environment, within an office environment, or as a server farm), while in other embodiments, the processors 1202 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of displaying semantic layers of source code, the method comprising:
    receiving a user selection of a first portion of the source code, the first portion displayed in a first display area, the first portion corresponding to a first semantic layer of the source code;
    receiving a user command referring to a second portion of the source code related to the first portion, the second portion corresponding to a second semantic layer of the source code; and
    displaying, using at least one processor of a machine, in response to the user command, a second display area for the second portion of the source code, the second display area surrounding the first display area and at least partially covering the first display area, in a graphical arrangement that allows the user to view and edit the first and second portions of the source code simultaneously, to indicate a difference in semantic layers between the first portion and the second portion, the second display area possessing a translucent quality to allow at least a portion of the first display area covered by the second display area to be visible.

2. The method of claim 1, the second display area comprising an editable area for the second portion.

3. The method of claim 1, the second portion comprising a redefinition of an object-oriented method of the first portion.

4. The method of claim 1, the second portion comprising an enhancement section of the first portion.

5. The method of claim 1, the second portion comprising at least one of a code stub, a mock object, and a code injection for the first portion.

6. The method of claim 1, the second portion comprising at least one of a proxy and a façade for the first portion.

7. The method of claim 1, the second portion comprising shadowed variables for variables of the first portion.

8. The method of claim 1, further comprising:
    receiving a second user command to alter a position of the first display area within the second display area;
    altering, in response to the second user command, the position of the first display area within the second display area; and
    relocating at least a part of the second portion within the second display area from above the first display area to below the first display area based on the position of the first display area being altered.

9. The method of claim 1, the displaying of the second display area comprising displaying the second display area to appear closer to a viewer than the first display area according to a three-dimensional effect.

10. The method of claim 1, at least one of the first display area and the second display area being collapsible.

11. A non-transitory computer-readable storage medium comprising instructions that, when executed by at least one processor of a machine, cause the machine to perform operations comprising:

receiving a user selection of a first portion of source code, the first portion displayed in a first display area, the first portion corresponding to a first semantic layer of the source code;

receiving a user command referring to a second portion of the source code related to the first portion, the second portion corresponding to a second semantic layer of the source code; and displaying, in response to the user command, a second display area for the second portion of the source code, the second display area surrounding the first display area and at least partially covering the first display area, in a graphical arrangement that allows the user to view and edit the first and second portions of the source code simultaneously, to indicate a difference in semantic layers between the first portion and the second portion, the second display area possessing a translucent quality to allow at least a portion of the first display area covered by the second display area to be visible.

12. The computer-readable storage medium of claim 11, the operations further comprising:

receiving a second user selection of a third portion of the source code, the third portion corresponding to the first semantic layer of the source code; and displaying, in response to the user command, the third portion in a third display area to indicate a relationship between the third portion and the second portion, and to indicate a difference in semantic layers between the third portion and the second portion.

13. The computer-readable storage medium of claim 11, the operations further comprising:

receiving a second user selection of a third portion of the source code, the third portion displayed in the first display area and encompassing the first portion, the third portion corresponding to the first semantic layer of the source code;

receiving a second user command referring to a fourth portion of the source code related to the third portion, the fourth portion corresponding to the second semantic layer of the source code; and displaying, in response to the second user command, a third display area for the fourth portion of the source code to indicate a relationship between the third portion and the fourth portion, and to indicate a difference in semantic layers between the third portion and the fourth portion.

14. A computer system comprising:

at least one processor; and memory comprising instructions that, when executed by the at least one processor, cause the at least one processor to perform operations comprising:

displaying source code in a first display area;

receiving a user selection of a first portion of the source code, the first portion corresponding to a first semantic layer of the source code;

receiving a user command referring to a second portion of the source code related to the first portion, the second portion corresponding to a second semantic layer of the source code; and displaying, in response to the user command, a second display area for the second portion of the source code, the second display area surrounding the first display area and at least partially covering the first display area to indicate a difference in semantic layers between the first portion and the second portion, the second display area possessing a translucent quality to allow at least a portion of the first display area covered by the second display area to be visible.

15. The computer system of claim 14, the second display area, when displayed, comprising the second portion.

16. The computer system of claim 14, the second display area, when displayed, comprising a text entry area for entering the second portion.

17. The computer system of claim 14, the displaying of the second display area relative to the first display area comprising employing at least one of different fonts, different border colors, and different background colors for the second display area relative to the first display area.

* * * * *